United States Patent Office 3,585,130
Patented June 15, 1971

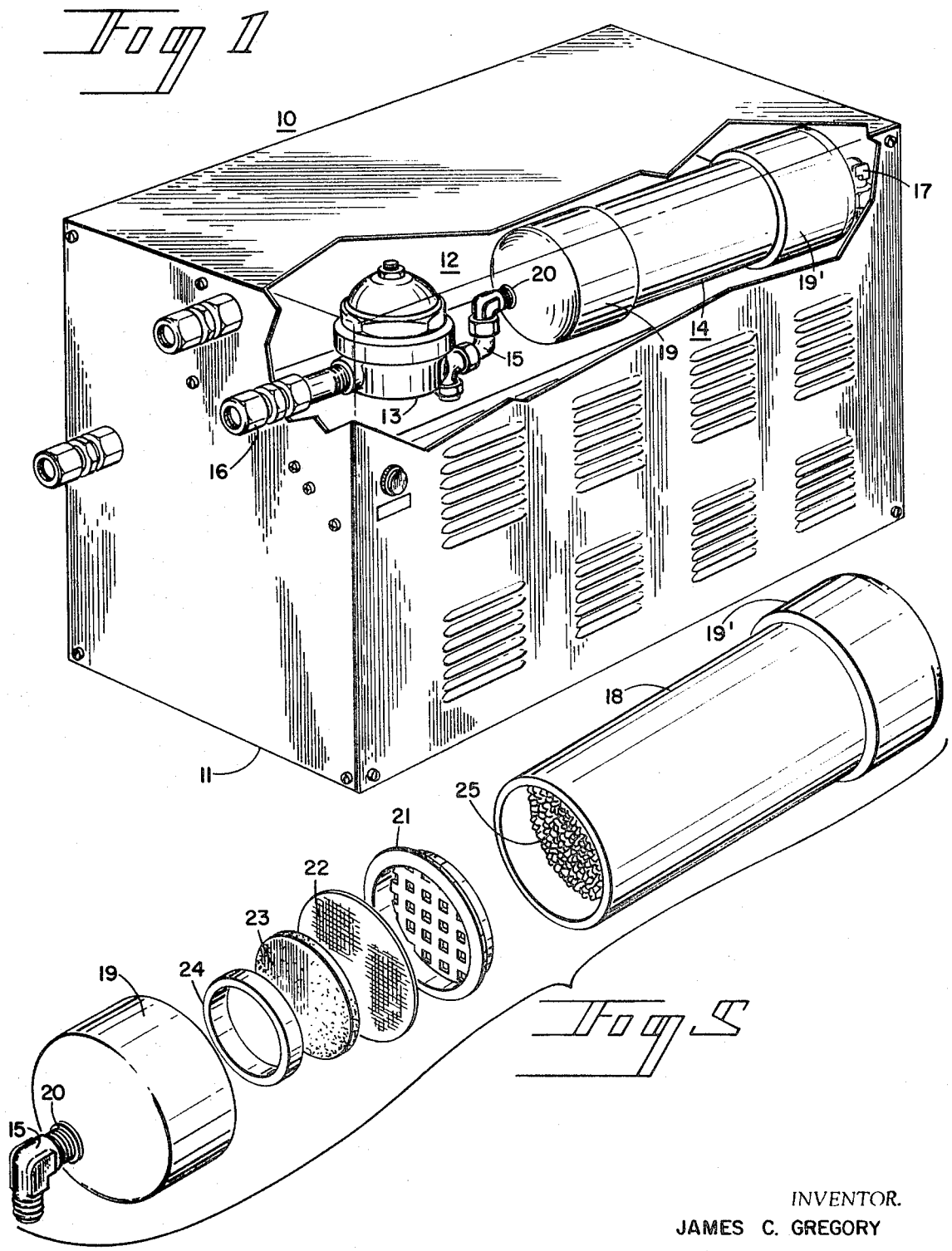

3,585,130
FILTER FOR WATER SUPPLY
James C. Gregory, 500 W. Clarendon Ave.,
Phoenix, Ariz. 85013
Filed June 5, 1970, Ser. No. 43,823
Int. Cl. B01d 27/02
U.S. Cl. 210—266                                    4 Claims

ABSTRACT OF THE DISCLOSURE

Filter and cooling system for purification of municipal and private water supplies.

BACKGROUND OF THE INVENTION

This invention relates to filtering and cooling systems for municipal, private and auxiliary water supplies and more particularly to the purification of such supplies.

FIELD OF THE INVENTION

This invention is particularly directed to the purification of water supplies of common carriers and private wells when used for domestic purposes.

DESCRIPTION OF THE PRIOR ART

A majority of the cities and towns take their water supply from ground sources and as a rule it is pure, clear and colorless although at times very hard, contains much iron in solution and has peculiar tastes and odors. Bacteriological and microscopic examination show that much ground water, wells and springs are not wholly free of pathogenic bacteria. All water collected for potable purposes ought to be tested before use since many of them in their natural state contain microorganisms some of which are pathogenic and others harmless.

With the introduction and general adoption of scientific processes for the purification of water for municipal and domestic purposes, it has necessitated the specialized treatment of each water supply. No two supplies are identical unless they form parts of the same system where the collection, purification and distribution of water is the same.

In some wells and other ground waters such minerals as salts of calcium, magnesium, iron and manganese are found in solution. Caustic soda, the silica of sodium, barium carbonate and other chemicals are used to rid water of its calcium and magnesium.

Some of the minor processes of purification involve the use of small mechanical filters such as granular bed filters, charcoal filters, boiling water filters and the like. None are completely satisfactory.

SUMMARY OF THE INVENTION

In accordance with the invention claimed an improved filtering arrangement for the purification of water is provided which employs an improved filter which quickly and efficiently further purifies municipal, private and auxiliary water supplies.

It is, therefore, one object of this invention to provide an improved filter for a domestic water system.

Another object of this invention is to provide an improved filter for a cooling system for municipal and private water supplies.

A further object of this invention is to provide an improved activated charcoal filter.

Further objects and advantages of the invention will become apparent as the following description proceeds and the features of novelty which characterize this invention will be pointed out with particularity in the claims annexed to and forming part of this application.

BRIEF DESCRIPTION OF THE DRAWING

The present invention may be more readily described by reference to the accompanying drawing in which:

FIG. 1 is a perspective view of a filtering system for municipal and private water supplies; and FIG. 2 is an exploded view of the filter structure.

DESCRIPTION OF PREFERRED EMBODIMENT

Referring more particularly to the drawing by characters of reference FIG. 1 discloses a water purification system 10 wherein the housing 11 is partially broken away to show the filtering arrangement 12. Since the claimed invention is directed to the filtering arrangement per se the refrigeration or cooling features will not be shown or described.

The filtering arrangement 12 comprises a pressure valve 13 connected to a filter 14 by a suitable pipe coupling 15. The pressure valve is connected to a source of water under pressure through coupling 16 while the filter is connected to the cooling portion of the purification system through couplings 17.

Filter 14, as shown in FIG. 2, comprises a hollow tubular housing 18 closed at each end by apertured caps 19, 19'. As shown the housing may be of a cylindrical configuration. Apertures 20 (only one of which is shown in FIGS. 1 and 2) threadedly connect pipe couplings 15 and 17 to the filter.

Clamped between each end of housing 18 and its cap 19 or 19' is an apertured disk shaped filter cap 21 which has inserted in it suitable filter paper 22 held in place in the disk shaped filter cap 21 by a wafer of a porous plastic solid foam like material 23 which is permeable to liquids but not to solids. In order to hold the disk shaped filter cap 21 firmly in place a collar 24 is placed on end against wafer 23 and is held there by the inside curvature of the caps 19 and 19'.

The hollow interior of cylindrical housing 18 is filled with activated charcoal 25.

In accordance with the invention claimed, an improved filter is provided which filters the water effectively while retaining the activated charcoal locked in place in the filter structure.

Although but one embodiment of the present invention has been illustrated and described, it will be apparent to those skilled in the art that various changes and modifications may be made therein without departing from the spirit of the invention or from the scope of the appended claims.

What is claimed is:

1. A filter for a liquid purifying system comprising:
a hollow tubular housing,
a pair of disk shaped caps for insertion one in each end of said housing, each disk shaped cap having a flange for engaging the outside end of said housing, a collar extending from said flange into said housing and a perforated base extending from said collar across said housing, filter paper arranged within each said disk shaped cap across said perforated base, a wafer of liquid permeable porous material arranged within each said disk shaped cap and over each said filter paper holding said filter paper against the base of said cap.

a pair of hollow caps one for closing each end of said housing, said hollow cap having a first apertured end for receiving a pipe fitting in said aperture and a second open end for snugly surrounding an end of said housing, and a sleeve for engaging each said wafer on one end and the inside of the first end of each said hollow cap for firmly clamping said collar against the end of said housing.

2. The combination set forth in claim 1 in further combination with activated charcoal for substantially filling the inside of said housing.

3. The combination set forth in claim 1 wherein said hollow tubular housing is cylindrical in shape.

4. The combination set forth in claim 3 wherein said hollow caps are cylindrical in shape.

References Cited
UNITED STATES PATENTS

| | | | |
|---|---|---|---|
| 2,325,657 | 8/1943 | Burkness | 210—289X |
| 2,525,497 | 10/1950 | Monfried | 210—293X |
| 2,772,002 | 11/1956 | Mauro | 210—289X |
| 3,529,726 | 9/1970 | Keenan | 210—282X |

SAMIH N. ZAHARNA, Primary Examiner

U.S. Cl. X.R.

210—282